(12) United States Patent
Pan et al.

(10) Patent No.: US 7,827,675 B2
(45) Date of Patent: Nov. 9, 2010

(54) METHOD OF MANUFACTURING AN ACTIVATED CARBON FIBER SOFT ELECTRIC HEATING PRODUCT

(76) Inventors: Ching-Ling Pan, 2F, No. 43-6, Lane 746, Jhong Jheng Road, Hsin Chuang City, Taipei County 242 (TW); Yung-Shun Wu, 12F-5, No. 206, Sec. 4, Chongsin Road, Sanchong City, Taipei County 241 (TW)

( * ) Notice: Subject to any disclaimer, the term of this patent is extended or adjusted under 35 U.S.C. 154(b) by 128 days.

(21) Appl. No.: 12/232,117

(22) Filed: Sep. 11, 2008

(65) Prior Publication Data
US 2010/0062667 A1    Mar. 11, 2010

(51) Int. Cl.
*H05B 3/00*   (2006.01)
(52) U.S. Cl. .............. 29/611; 29/613; 29/619; 29/620; 29/829; 219/529; 219/543; 219/549
(58) Field of Classification Search ............ 29/613, 29/619–621, 829, 846, 874; 219/497, 529, 219/543, 545, 549
See application file for complete search history.

(56) References Cited

U.S. PATENT DOCUMENTS 6,172,344 B1 * 1/2001 Gordon et al. ............. 219/529
6,483,087 B2 * 11/2002 Gardner et al. ............. 219/545

\* cited by examiner

*Primary Examiner*—Thiem Phan
(74) *Attorney, Agent, or Firm*—Rosenberg, Klein & Lee

(57) ABSTRACT

A method of manufacturing an activated carbon fiber soft electric heating product for overcoming existing problems including uneven temperature rise and heat dissipation at surfaces of the product, unbendable feature, short life and poor safety. An activated carbon fiber cloth and a woven fiber cloth of the activated carbon fiber soft electric heating product are fixed by an epoxy resin layer, and a conducting copper net is disposed between the activated carbon fiber cloth and the epoxy resin layer and coupled to a power input wire. The manufacturing method includes the steps of: (1) spraying an epoxy resin on a surface of the woven fiber cloth, and bake-drying and hot pressing the woven fiber cloth; and (2) connecting the conducting copper net and the power input wire, laying the activated carbon fiber cloth, and performing a second-time hot pressing. Meanwhile, carbon fiber constitutes a heat generating surface with the advantages of a light weight, a soft texture, a bendable feature, a uniform electric heating performance, a fast temperature rise, a highly safe, reliable and long life feature. In addition, the method of the invention involves a simple technical skill and an easy operation.

8 Claims, 1 Drawing Sheet

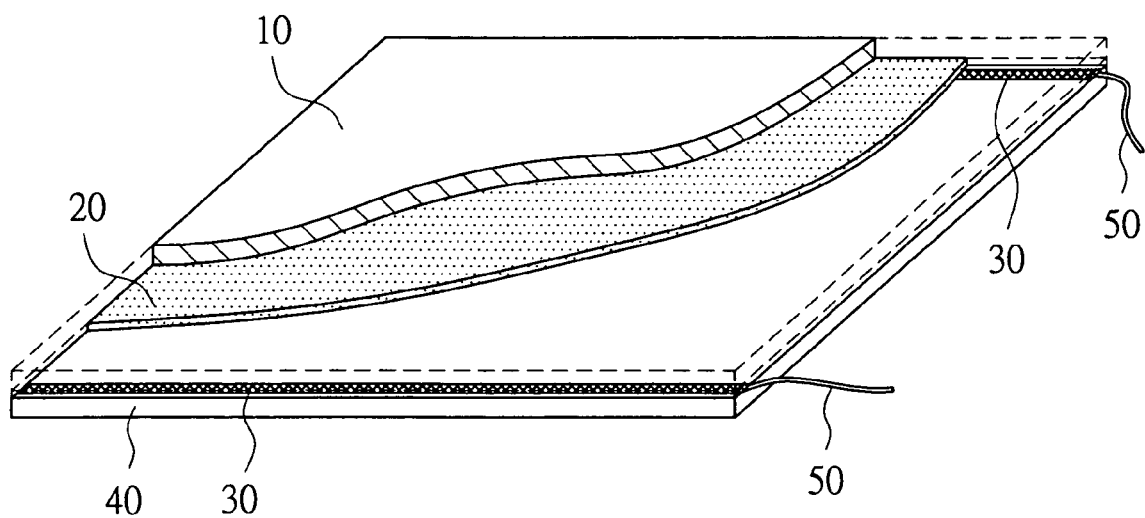

METHOD OF MANUFACTURING AN ACTIVATED CARBON FIBER SOFT ELECTRIC HEATING PRODUCT

BACKGROUND OF THE INVENTION

1. Field of the Invention

The present invention relates to an activated carbon fiber soft electric heating product and its manufacturing method, and more particularly to a design for a carbon fiber electric heating product and its manufacturing method.

2. Description of the Related Art

At present, electric heating devices such as electric blankets and electric heating pads used for heating and warming are generally made of metals and carbon fibers including various types of metal electric heating wires. However, these electric heating wires may be bent, and their external plastic films are aged easily to give rise to a safety issue. Carbon fiber is a high performance material with an excellent electrical conductivity, a powerful far infrared radiation, and a high thermal conductivity, and thus it is used extensively in our daily life as its cost drops. At present, most carbon fiber electric heating components adopt long filaments for heating, and if the long filaments are used for producing soft flexible conducting electric heating products, the soft flexible surface of the carbon fiber electric heating product will have an uneven temperature rise or heat dissipation. If a vertical long filament is broken or short-circuited, the product may fail or a fire may occur due to sparks so produced.

SUMMARY OF THE INVENTION

A primary object of the invention is to overcome existing problems of a conventional electric heating product including uneven temperature rise and heat dissipation at surfaces thereof, unbendable feature, short life and poor safety as well as to provide an activated carbon fiber soft electric heating product and a manufacturing method thereof.

An activated carbon fiber soft electric heating product includes a woven fiber cloth, an epoxy resin layer, a conducting copper net, an activated carbon fiber cloth and a power input wire. An epoxy resin layer is disposed between the woven fiber cloth and the activated carbon fiber cloth, and a conducting copper net is disposed between the activated carbon fiber cloth and the epoxy resin layer. The conducting copper net is coupled to the power input wire.

According to the invention, a method of manufacturing an activated carbon fiber soft electric heating product includes the steps of: (1) spraying epoxy resin on a side of a surface of the woven fiber cloth, drying the woven fiber cloth at a temperature of 80-100° C. for 5-10 min, and hot pressing the woven fiber cloth at a temperature of 120-140° C. and a pressure of 200-250 kg/cm$^2$ for 3-5 min, and the hot pressing temperature remaining constant during the hot pressing process, so as to obtain an epoxy resin layer on a side of the surface of the woven fiber cloth; and (2) sewing a conducting copper net on both ends of a surface of the epoxy resin layer of the woven fiber cloth, and coupling the conducting copper net with a power input wire, and laying the epoxy resin layer flatly on the activated carbon fiber cloth, and performing a second-time hot pressing the woven fiber cloth at a temperature of 160-180° C., and a pressure of 250-400 kg/cm$^2$ for 6-8 min, and the hot pressing temperature remaining constant during the second-time hot pressing process, so as to obtain the activated carbon fiber soft electric heating product.

The stop of manufacturing the activated carbon fiber cloth comprises the steps of weaving an inorganic fiber into an inorganic fiber cloth and going through a soaking process, a bake-drying process, two times of carbonization, two times of activation, and an ash content of the activated carbon fiber cloth is 0.5-1.5% (by weight), and a-carbon content of the activated carbon fiber cloth is 95-98% (by weight). Furthermore, the method of manufacturing the activated carbon fiber cloth includes the steps of: (a) weaving an inorganic fiber into an inorganic fiber cloth, and soaking the inorganic cloth for 0.5-1 hour, and bake-drying the inorganic cloth at 80-100° C. until the water content percentage is 1-10%; (b) performing two times of carbonization to the inorganic fiber cloth of Step (a) in a carbonization furnace, and the first-time carbonization takes place at a temperature of 200-350° C., and a speed of 20-40 m/h, and the second-time carbonization takes place at a temperature of 300-480° C. and a speed of 40-60 m/h; (c) performing two times of activation to the inorganic fiber cloth obtained from the Step (b) in an activation furnace, and the first-time activation takes place at a temperature of 500-1200° C., and the second-time activation takes place at a temperature of 600-950° C., and the activation speeds for both times are 50-60 m/h; and (d) removing any attached matter on the surface of the inorganic fiber cloth by a vacuum cleaner after the activation to obtain the activated carbon fiber cloth.

According to an activated carbon fiber soft electric heating product of the invention, carbon fiber constitutes a heat generating surface with the advantages of a light weight, a soft texture, a bendable feature, a uniform electric heating performance, a fast temperature rise, a highly safe, reliable and long life feature, and thus the product can be used as outdoor warming clothes, indoor sofas and beds, and automobile backrests, etc. The product of the present invention produces far infrared waves while generating heat, and the far infrared waves are good to human bodies for healthcare effects such as reducing symptoms of rheumatic diseases and arthritis, and expediting medical effects and recoveries. In addition, the method of the invention involves a simple technical skill and an easy operation.

BRIEF DESCRIPTION OF THE DRAWING

The FIGURE shows a structure of the present invention.

DETAILED DESCRIPTION OF THE PREFERRED EMBODIMENTS

The technical measures and structural characteristics of the present invention will become apparent with the detailed description of preferred embodiments and related drawings as follows.

With reference to the FIGURE for a first preferred embodiment of the present invention, an activated carbon fiber soft electric heating product of this preferred embodiment comprises a woven fiber cloth 10, an epoxy resin layer 20, a conducting copper net 30, an activated carbon fiber cloth 40 and a power input wire 50, wherein the woven fiber cloth 10 and the activated carbon fiber cloth 40 are fixed and connected with each other through the epoxy resin layer 20, and the conducting copper net 30 is disposed on edges of two opposite sides between the activated carbon fiber cloth 40 and the epoxy resin layer 20 and coupled to the power input wire 50.

The woven fiber cloth of this preferred embodiment is made of polyester long-fiber yarns and cotton short-fiber yarns, with a weight of 60 g/m$^2$-80 g/m$^2$, and the thickness of the woven fiber cloth is 0.2 mm-0.05 mm, and the thickness of the epoxy resin layer is 0.01 mm-0.05 mm.

The activated carbon fiber soft electric heating product of this preferred embodiment is made of a soft material that can be bent freely. Within a DC or AC safe voltage of 36V, several activated carbon fiber soft electric heating products can be connected in series or in parallel according to the required length and length for manufacturing a shoulder pad, a knee pad, a waist support, a glove, a shoe, a cushion or a mattress.

In a second preferred embodiment, the method of manufacturing the activated carbon fiber soft electric heating product comprises the steps of: (1) spraying epoxy resin on a side of a surface of the woven fiber cloth, drying the woven fiber cloth at a temperature of 80-100° C. for 5-10 min, and then hot pressing the woven fiber cloth at a temperature of 120-140° C. and a pressure of 200-250 kg /cm$^2$ for 3-5 min, and the hot pressing temperature remains constant during the hot pressing process, so as to obtain an epoxy resin layer on a woven fiber cloth; and (2) sewing a conducting copper net on both ends of the surface of the epoxy resin layer of the woven fiber cloth, and coupling the conducting copper net with a power input wire, and laying the epoxy resin layer flatly on the activated carbon fiber cloth, and then performing a second-time hot pressing at a temperature of 160-180° C. and a pressure of 250-400 kg/cm$^2$ for 6-8 min, and the hot pressing temperature remains constant during the second-time hot pressing process to obtain the activated carbon fiber soft electric heating product.

In a third preferred embodiment, the difference of this preferred embodiment from the second preferred embodiment resides on the first step of this preferred embodiment being done at a hot pressing temperature of 125° C. -135° C., and the rest are the same as the second preferred embodiment.

In a fourth preferred embodiment, the difference, of this preferred embodiment from the second preferred embodiment resides on the first step of this preferred embodiment being done at a hot pressing temperature of 130° C., and the rest are the same as the second preferred embodiment.

In a fifth preferred embodiment: the difference of this preferred embodiment from the second preferred embodiment resides on the first step of this preferred embodiment being done at a hot pressing pressure of 220-240 kg/cm$^2$, and the rest are the same as the second preferred embodiment.

In a sixth preferred embodiment, the difference of this preferred embodiment from the second preferred embodiment resides on the first step of this preferred embodiment being done at a hot pressing pressure of 230 kg/cm$^2$, and the rest are the same as the second preferred embodiment.

In a seventh preferred embodiment, the difference of this preferred embodiment from the second preferred embodiment resides on the second step of this preferred embodiment having a second-time hot pressing temperature of 165° C.-175° C., and the rest are the same as the second preferred embodiment.

In an eighth preferred embodiment, the difference of this preferred embodiment from the second preferred embodiment resides on the second step of this preferred embodiment having a second-time hot pressing temperature of 170° C., and the rest are the same as the second preferred embodiment.

In a ninth preferred embodiment, the difference of this preferred embodiment from the second preferred embodiment resides on the second step of this preferred embodiment having a second-time hot pressing pressure of 300-350 kg/cm$^2$, and the rest are the same as the second preferred embodiment.

In a tenth preferred embodiment, the difference of this preferred embodiment from the second preferred embodiment resides on the second step of this preferred embodiment having a second-time hot pressing pressure of 320 kg/cm$^2$, and the rest are the same as the second preferred embodiment.

In an eleventh preferred embodiment, this preferred embodiment further describes the manufacturing method of the activated carbon fiber cloth wherein an inorganic fiber is woven into an inorganic fiber cloth, and gone though a soaking process, a bake-drying process, two times of carbonization, two times of activation, and the ash content of the activated carbon fiber cloth is 0.5-1.5% (by weight), and the carbon content of the activated carbon fiber cloth is 95-98% (by weight). The manufacturing method comprises the steps of: (a) weaving an inorganic fiber into an inorganic fiber cloth, and soaking the inorganic cloth for 0.5-1 hour, and bake-drying the inorganic cloth at 80-100° C. until the water content percentage is 1-10%; (b) performing two times of carbonization to the inorganic fiber cloth of the Step (a) in a carbonization furnace, and the first-time carbonization takes place at a temperature of 200-350° C., and a speed of 20-40 m/h, and the second-time carbonization takes place at a temperature of 300-480° C. and a speed of 40-60 m/h; (c) performing two times of activation to the inorganic fiber cloth obtained from the Step (b) in an activation furnace, and the first-time activation takes place at a temperature of 500-1200° C., and the second-time activation takes place at a temperature of 600-950° C., and the activation speeds for both times are 50-60 m/h; and (d) removing any attached matter on the surface of the inorganic fiber cloth by a vacuum cleaner after the activation, so as to obtain an activated carbon fiber cloth with an ash content of 0.5-1.5% (by weight) and a carbon content of 95-98% (by weight).

The soaking solution of this preferred embodiment is ammonium bromide solution with a concentration of 5-10% (by weight).

In a twelfth preferred embodiment, this preferred embodiment further describes the inorganic fiber in the Step (1) of the eleventh preferred embodiment, the inorganic fiber is a preoxidized polyacrylonitrile-based filament, and the rest are the same as the eleventh preferred embodiment.

In a thirteenth preferred embodiment, this preferred embodiment further describes the inorganic fiber in Step (1) of the eleventh preferred embodiment, the inorganic fiber has a diameter of 0.1 mm-0.3 mm, and the rest are the same as the eleventh preferred embodiment.

In a fourteenth preferred embodiment, the difference of this preferred embodiment from the eleventh preferred embodiment resides on that the first-time carbonization in Step (b) of this preferred embodiment takes place at a temperature of 240° C.-300° C. and preferably 240° C., and the rest are the same as the eleventh preferred embodiment.

In a fifteenth preferred embodiment, the difference of this preferred embodiment from the eleventh preferred embodiment resides on that the first-time carbonization in Step (b) of this preferred embodiment takes place at a temperature of 240° C.-300° C. and preferably 280° C., and the rest are the same as the eleventh preferred embodiment.

In a sixteenth preferred embodiment, the difference of this preferred embodiment from the eleventh preferred embodiment resides on that the first-time carbonization in Step (b) of this preferred embodiment takes place at a temperature of 240° C.-300° C. and preferably 300° C., and the rest are the same as the eleventh preferred embodiment.

In a seventeenth preferred embodiment, the difference of this preferred embodiment from the eleventh preferred embodiment resides on that the second-time carbonization in Step (b) of this preferred embodiment takes place at a temperature of 350° C.-450° C. and preferably 350° C., and the rest are the same as the eleventh preferred embodiment.

In an eighteenth preferred embodiment, the difference of this preferred embodiment from the eleventh preferred embodiment resides on that the second-time carbonization in Step (b) of this preferred embodiment takes place at a temperature of 350° C.-450° C. and preferably 400° C., and the rest are the same as the eleventh preferred embodiment.

In a nineteenth preferred embodiment, the difference of this preferred embodiment from the eleventh preferred embodiment resides on that the second-time carbonization in Step (b) of this preferred embodiment takes place at a temperature of 350° C.-450° C. and preferably 450° C., and the rest are the same as the eleventh preferred embodiment.

In a twentieth preferred embodiment, the difference of this preferred embodiment from the eleventh preferred embodiment resides on that the first-time carbonization in Step (c) of this preferred embodiment takes place at a temperature of 600° C.-1000° C. and preferably 600° C., and the rest are the same as the eleventh preferred embodiment.

In a twenty-first preferred embodiment, the difference of this preferred embodiment from the eleventh preferred embodiment resides on that the first-time carbonization in Step (c) of this preferred embodiment takes place at a temperature of 600° C.-1000° C. and preferably 800° C., and the rest are the same as the eleventh preferred embodiment.

In a twenty-second preferred embodiment, the difference of this preferred embodiment from the eleventh preferred embodiment resides on that the first-time carbonization in Step (c) of this preferred embodiment takes place at a temperature of 600° C.-1000° C. and preferably 1000° C., and the rest are the same as the eleventh preferred embodiment.

In a twenty-third preferred embodiment, the difference of this preferred embodiment from the eleventh preferred embodiment resides on that the second-time carbonization in Step (c) of this preferred embodiment takes place at a temperature of 700° C.-900° C. and preferably 700° C., and the rest are the same as the eleventh preferred embodiment.

In a twenty-four preferred embodiment, the difference of this preferred embodiment from the eleventh preferred embodiment resides on that the second-time carbonization in Step (c) of this preferred embodiment takes place at a temperature of 700° C.-900° C. and preferably 800° C., and the rest are the same as the eleventh preferred embodiment.

In a twenty-five preferred embodiment, the difference of this preferred embodiment from the eleventh preferred embodiment resides on that the second-time carbonization in Step (c) of this preferred embodiment takes place at a temperature of 700° C.-900° C. and preferably 900° C., and the rest are the same as the eleventh preferred embodiment.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A method of manufacturing an activated carbon fiber soft electric heating product, comprising the steps of: (1) spraying epoxy resin on a side of a surface of the woven fiber cloth, drying the woven fiber cloth at a temperature of 80-100° C. for 5-10 min, and hot pressing the woven fiber cloth at a temperature of 120-140° C. and a pressure of 200-250 kg/cm$^2$ for 3-5 min, and the hot pressing temperature remaining constant during the hot pressing process, so as to obtain an epoxy resin layer on a side of the surface of the woven fiber cloth; and (2) sewing a conducting copper net on both ends of a surface of the epoxy resin layer of the woven fiber cloth, and coupling the conducting copper net with a power input wire, and laying the epoxy resin layer flatly on the activated carbon fiber cloth, and performing a second-time hot pressing the woven fiber cloth at a temperature of 160-180° C., and a pressure of 250-400 kg/cm$^2$ for 6-8 min, and the hot pressing temperature remaining constant during the second-time hot pressing process, so as to obtain the activated carbon fiber soft electric heating product.

2. The method of manufacturing an activated carbon fiber soft electric heating product as recited in claim 1, wherein the step (1) has a hot pressing temperature of 125° C.-135° C. and a hot pressing pressure of 220 kg/cm$^2$-240 kg/cm$^2$.

3. The method of manufacturing an activated carbon fiber soft electric heating product as recited in claim 1, wherein the step (2) has a second-time hot pressing temperature of 165° C.-175° C. and a second-time hot pressing pressure is 300 kg/cm$^2$-350 kg/cm$^2$.

4. The method of manufacturing an activated carbon fiber soft electric heating product as recited in claim 1, wherein the Step (2) of manufacturing the activated carbon fiber cloth comprises the steps of weaving an inorganic fiber into an inorganic fiber cloth and going through a soaking process, a bake-drying process, two times of carbonization, two times of activation, and an ash content of the activated carbon fiber cloth is 0.5-1.5% (by weight), and a carbon content of the activated carbon fiber cloth is 95-98% (by weight).

5. The method of manufacturing an activated carbon fiber soft electric heating product as recited in claim 4, wherein the method of manufacturing the activated carbon fiber cloth comprises the steps of: (a) weaving an inorganic fiber into an inorganic fiber cloth, and soaking the inorganic cloth for 0.5-1 hour, and bake-drying the inorganic cloth at 80-100° C. until the water content percentage is 1-10%; (b) performing two times of carbonization to the inorganic fiber cloth of Step (a) in a carbonization furnace, and the first-time carbonization takes place at a temperature of 200-350° C., and a speed of 20-40 m/h, and the second-time carbonization takes place at a temperature of 300-480° C. and a speed of 40-60 m/h; (c) performing two times of activation to the inorganic fiber cloth obtained from the Step (b) in an activation furnace, and the first-time activation takes place at a temperature of 500-1200° C., and the second-time activation takes place at a temperature of 600-950° C., and the activation speeds for both times are 50-60 m/h; and (d) removing any attached matter on the surface of the inorganic fiber cloth by a vacuum cleaner after the activation to obtain the activated carbon fiber cloth.

6. The method of manufacturing an activated carbon fiber soft electric heating product as recited in claim 5, wherein the soaking solution for Step (a) is ammonium bromide solution with a concentration of 5-10% (by weight).

7. The method of manufacturing an activated carbon fiber soft electric heating product as recited in claim 5, wherein the first-time carbonization in Step (b) takes place at a temperature of 240° C.-300° C. while the second-time carbonization is done at a temperature of 350° C.-450° C.

8. The method of manufacturing an activated carbon fiber soft electric heating product as recited in claim 5, wherein the first-time activation in Step (c) takes place at a temperature of 600° C.-1000° C. while the second-time activation is done at a temperature of 700° C.-900° C.

* * * * *